United States Patent
Weiβ et al.

(10) Patent No.: US 8,763,935 B2
(45) Date of Patent: Jul. 1, 2014

(54) NOZZLE OF A VALVE

(75) Inventors: Johann Weiβ, Wangen (DE); Ralph Wassermann, Memmingen (DE); Peter Wiedemann, Derndorf (DE)

(73) Assignee: SVM Schultz Verwaltungs-GmbH Co. KG, Memmingen (DE)

( * ) Notice: Subject to any disclaimer, the term of this patent is extended or adjusted under 35 U.S.C. 154(b) by 604 days.

(21) Appl. No.: 13/017,616

(22) Filed: Jan. 31, 2011

(65) Prior Publication Data
US 2011/0192919 A1   Aug. 11, 2011

(30) Foreign Application Priority Data

Feb. 1, 2010   (DE) .......................... 10 2010 006 604

(51) Int. Cl.
*F16K 1/42*   (2006.01)
*B05B 1/00*   (2006.01)

(52) U.S. Cl.
USPC ........ 239/585.1; 239/583; 239/602; 251/333; 251/334; 251/359

(58) Field of Classification Search
USPC ............... 239/533.13, 533.14, 541, 546, 583, 239/584, 585.1–585.5, 589, 592, 593, 595, 239/596, 601, 602, DIG. 12, DIG. 19; 251/333, 334, 359
See application file for complete search history.

(56) References Cited

U.S. PATENT DOCUMENTS 3,168,766 A * 2/1965 Hornick ........................ 222/597
5,007,457 A * 4/1991 Jones ........................ 137/624.14
6,840,504 B2 * 1/2005 Hagiwara et al. ............. 251/332

FOREIGN PATENT DOCUMENTS

| DE | 2122558 | 11/1972 |
| DE | 10 2007 006 934 A1 | 8/2008 |
| DE | 10 2007 009 168 A1 | 8/2008 |
| DE | 10 2008 000 505 A1 | 9/2009 |
| GB | 2327740 A | 3/1999 |

OTHER PUBLICATIONS

An Official Action from the European Patent Office issued in corresponding European Appln. No. EP 11 00 06 31.9 dated Nov. 27, 2012 and its translation (10 pages).

* cited by examiner

*Primary Examiner* — Darren W Gorman
(74) *Attorney, Agent, or Firm* — McCormick, Paulding & Huber, LLP

(57) ABSTRACT

A nozzle of a valve includes a nozzle edge limiting a nozzle opening with a sealing surface that can be sealed or released by a nipple. Spaced apart from the nozzle edge at least one supporting surface for the nipple is provided on the nozzle. The supporting surface is spaced apart from the nozzle edge by a distance area.

11 Claims, 4 Drawing Sheets

Figure 2A:
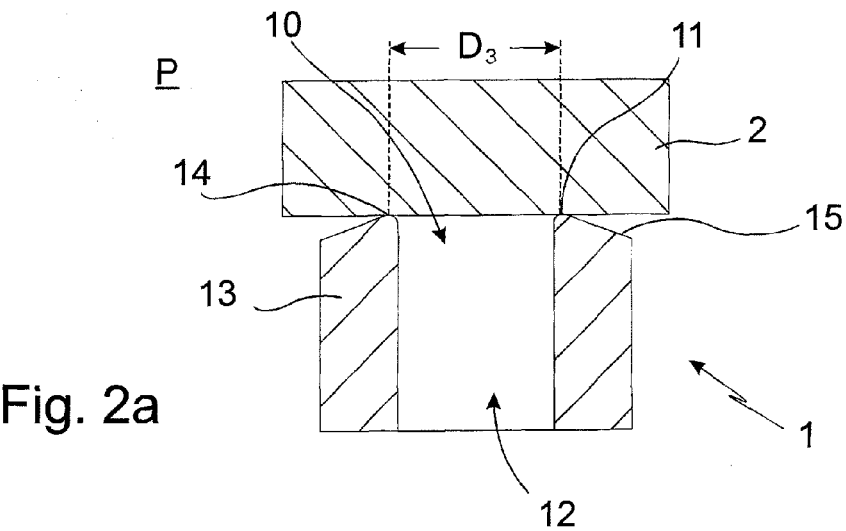

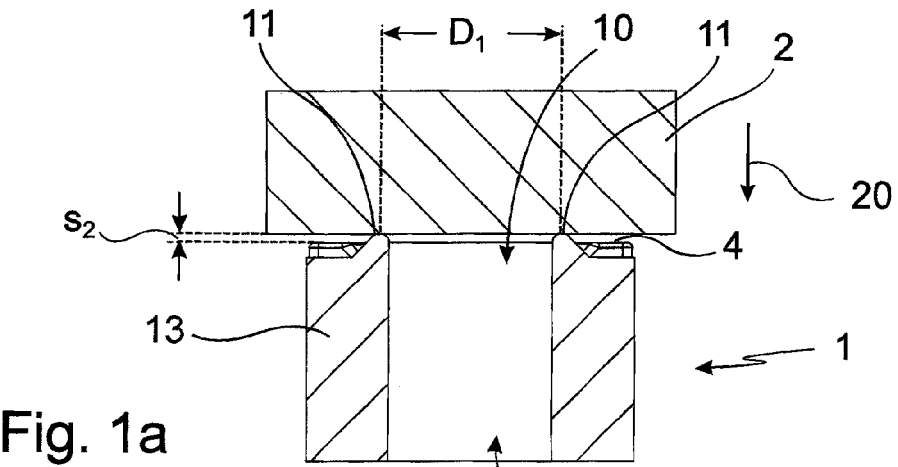
Fig. 1a
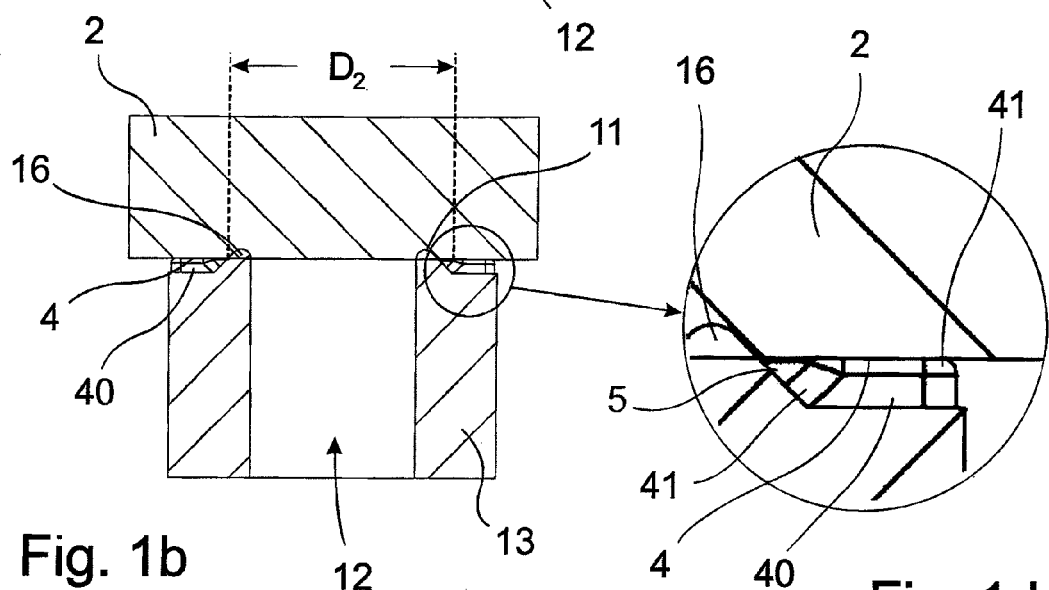
Fig. 1b
Fig. 1d
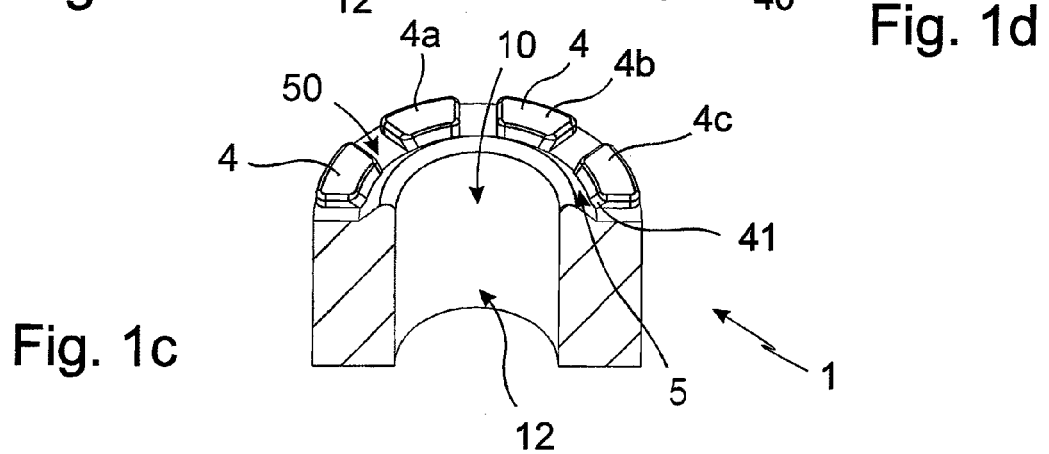
Fig. 1c

Prior Art

NOZZLE OF A VALVE

CROSS REFERENCE TO RELATED APPLICATIONS

This application is entitled to the benefit of, claims priority to, and incorporates by reference essential subject matter disclosed in, German Patent Application No. 10 2010 006 604.4 filed on Feb. 1, 2010.

The invention refers to a nozzle, in particular a nozzle of a valve. The nozzle has a nozzle opening that can be sealed or released by a nipple, and the nozzle opening is limited by a nozzle edge. The nozzle edge interacts with the nipple.

BACKGROUND OF THE INVENTION

Nozzles as described in the beginning are sufficiently known in technology. As an example it is referred here also to the drawing, in particular FIGS. 2a, 2b and 2c where a nozzle according to the state of the art is shown. The nozzle is formed here by a nozzle boring arranged in a nozzle body. The invention is not restricted here to a boring, that is a metal-cutting machining, being cut in a nozzle body, the nozzle boring can occur here, for example, also in a tube-like profile. The end of the nozzle boring facing the nipple defines the nozzle opening. The nozzle opening is limited by a nozzle edge interacting sealing with the nipple, as a rule an elastomer or similarly elastic material. It has to be considered here that the nozzle edge is not only a line-like element, but the nozzle edge can also have a certain expansion, it may also be designed, for example, annularly or bead-like, wherein the term nozzle edge comprises in this respect also (a) corresponding surface(s) (plane or arched).

Often the arrangement is chosen such that the nozzle, in particular the nozzle body, is designed stationary in the valve, and the nipple is slid or pressed on the nozzle edge via an appropriate actuator, for example an adjusting element, an armature rod, an armature or the like.

As it can be seen clearly in particular in FIG. 2a, the nozzles have a cone-like design in such a way that the nozzle edge is on a bead (on the side of the end) on the nozzle opening that then declines in a cone-like or truncated cone-like area towards the side.

Figure 2B:
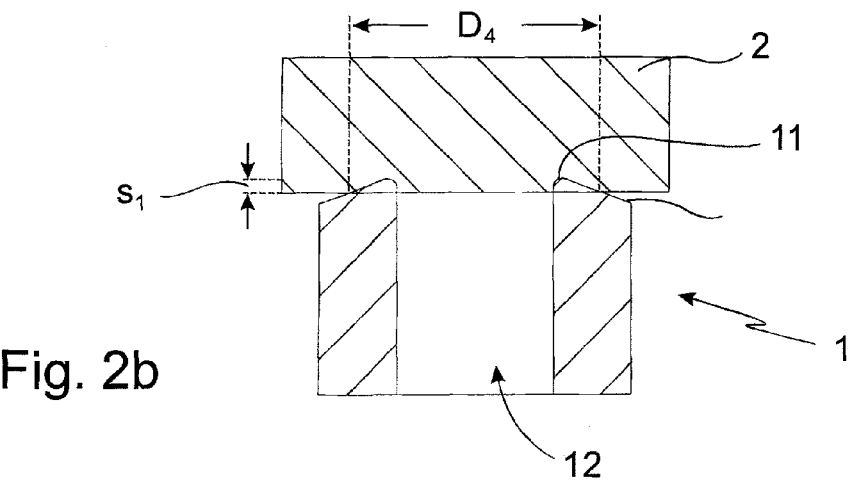

It is usual that the used material of the nipple wears out. FIG. 2a shows a rather new nipple in use, an already slightly aged nipple is shown in FIG. 2b. Usually the nipple is on the side of the nozzle where also the pressure is connected to the nozzle. The nipple put on the nozzle opening defines a limiting edge on the lateral cone of the nozzle. This separating edge encircles the sealing surface on the nozzle. The holding power is the product of the sealing surface and the pressure connected to the nipple. If FIG. 2a is compared with FIG. 2b the result will be that, when the age of the nipple increases, this is slid farther onto the cone of the nozzle, and thus the limiting edge is widened and thus also the sealing surface, and as a result the necessary holding power increases.

If the nozzle is inserted in a solenoid valve, this will lead to a larger travel of the armature connected with a larger current consumption and the risk of an increasing leakage. The result is here a limit of the service life of the valves, in particular the solenoid valves, equipped with corresponding nozzles.

BRIEF DESCRIPTION OF THE INVENTION

It is an object of the present invention to improve at least one of the above-mentioned disadvantages of the state of the art.

In order to solve this problem the invention refers to a nozzle as described in the beginning, and suggests that on the nozzle spaced apart from the nozzle edge, at least one supporting surface is provided for the nipple, and the supporting surface is spaced apart from the nozzle edge by a distance area. The nipple supported on the supporting area and the nozzle edge bridges and covers the distance area freely, thus does not take over a sealing function what would lead otherwise to an increasing of the sealing surface together with the above-mentioned disadvantages.

The suggestion according to the invention achieves here that a nipple already slightly aged and therefore worn out by an amount of switching operations does not lead anymore to an increased sealing surface, such as in the state of the art, what was paired at the same time according to the state of the art with a supporting function, but the nipple can be supported then on a supporting surface spaced apart from the nozzle edge, wherein this additional support surface is not part of the sealing surface, and therefore does not increase the holding power (this is the result of the product of the sealing surface with the pressure connected with the valve space).

Another surprising advantage of the invention is the fact that by the exact positioning of the supporting surface with reference to the nozzle edge, the travel of the nipple and thus also the travel of the element (for example the armature rod or eventually the armature) driving or moving the nipple can be adjusted more precisely, and thus also, for example with a solenoid as driving element for the nipple, this can be optimized further. The last consequence is optimizing the attraction current and thus also reducing the energy consumption of a solenoid valve of this type over its entire service life as the geometric characteristics of the nipple position relatively to the nozzle change only very slightly, if at all, when the nipple gets older.

In a preferred embodiment of the invention developing the subject matter of claim number 1 that, however, can also be realized in connection with all single or combinations of other embodiments, it is provided that the supporting surface recedes with respect to the nozzle edge in the direction of the feed motion of the nipple to the nozzle opening. The feed motion of the nipple to the nozzle opening is carried out, as a rule, also parallel to the longitudinal extension of the nozzle boring. Therefore the arrangement is chosen in such a way that, first of all, the nipple is supported on the sealing surface defined by the nozzle edge, and seals the nozzle. In order to make unambiguously clear that, first of all, the nipple is supported on the nozzle edge or the sealing surface, the supporting surface recedes slightly. The nipple is made of elastic material, preferably of an elastomer. The feed motion of the nipple towards the nozzle opening is carried out with appropriate power because of which the elastic material of the nipple is compressed. The resulting surface pressure in the nipple is rather large as the surface is rather small and now also has thus to define a rather small, constant sealing surface. This rather large pressure stress always in the same area of the nipple leads to a corresponding fatigue and wear or aging of the nipple. For the supporting function of the nipple on the nozzle the supporting surface(s) distanced from the nozzle edge is/are provided, that cleverly are designed clearly larger than the surface on the sealing ring or the nozzle edge. In this respect the supporting surface then also acts as stopper for the motion of the nipple, and the elastic material is also only slightly compressed in the area of the nozzle edge. In this respect the material is in this rather strongly stressed area of the nipple is saved and relieved which is also positive for the permanence and service life of the entire valve.

In a modification according to the invention developing the subject matter of claim number one as well as the preceding embodiment it is provided that the nipple aged in particular by a number of switching operations is supported on the supporting surface. According to a design of the invention it is possible that the nipple is not supported immediately at the beginning of the use of the appropriately equipped valve also on the supporting surface when the nipple is supported on the nozzle edge. In this respect, the invention comprises two solutions where, first of all, at the beginning of the use of the nozzle, if the material of the nipple still is sufficiently elastic and therefore the nipple is only in contact with the nozzle edge of the nozzle. During the further process, when the nipple has been aged accordingly, however, then the supporting surface offers an additional support. The construction according to the invention is thus alternatively designed also in such a way that the use of the supporting surfaces is not active immediately at the beginning of the use of the valve, but only later on. Then, however, the nozzle according to the invention is already equipped to relieve the nipple sufficiently and to provide, even with a large number of valve switching operations, still a sufficient leakage safety when the holding current is low. The problem formulated in the beginning is also solved by the described embodiment, and thus develops it as well as the other embodiments.

For the design and also arrangement of the supporting surface suggested according to the invention, the invention provides several possibilities developing the main subject and the other modifications. First of all, in a modification according to the invention the invention is designed in such a way that the supporting surface surrounds the nozzle opening (for example annularly). However, it is also possible that not only one supporting surface but also a number of supporting surfaces is provided according to the invention, wherein the single supporting surfaces (segments) surround the nozzle opening annularly. Thus, for example, on the nozzle body in the area of the nozzle, a number of single elevations is provided that are in a preferred way each separated from one another by a compensation channel. The result of this suggestion is that cleverly the supporting function of the nipple on the nozzle is removed completely away from the nozzle edge (and thus also from the sealing function), and it is also distributed to a much larger supporting surface (altogether), which influences the material stress of the nipple very positively.

The invention does not only comprise here solutions where the supporting surfaces are arranged around the nozzle opening, the invention comprises also solutions where the nozzle edge surrounds the supporting surface, that is the supporting surface is arranged, for example, in the nozzle or the nozzle opening (for example concentrically or coaxially). Such a suggestion also leads to a relief of the nipple material in the area of the nozzle edges, and develops the above-described embodiments or modifications, and serves accordingly also for solving the problem of the invention described in the beginning.

It is favorable when the supporting surface is parallel or essentially parallel to the sealing surface defined by the nozzle edge. The advantage of the invention is the fact that a separation of the sealing function of the nozzle and the supporting function of the nipple on the nozzle is provided. One or more supporting surfaces separated from the nozzle edge are provided for the supporting function. It is, of course, possible that the nipple has a slightly more complex structure, and has nipple areas, for example tilted towards the sealing surface, interacting with accordingly tilted supporting surfaces in order to reach a reliable support. However, it is easier for the production of the nipple when the side of the nipple facing the nozzle itself is plane, and the nipple is supported snugly with its entire surface on the supporting surface(s). According to this, the before-described modification also serves for the development of the before-described solutions, and serves also singly or in combination with one or more of the modifications described before for solving the problem of the invention.

An advantage of the analogous orientation of the supporting surfaces, on the one hand, and the nipple areas interacting with the supporting surfaces, on the other hand, is that thus with a graded nipple there is also an unambiguous final position of the nipple on the edge of the nozzle, and thus immersing of the nozzle in the material of the nipple along the axial position (with reference to the nozzle boring) is restricted. Therefore, this position can be accordingly perfected, the here necessary travel can be limited.

Another modification according to the invention provides a ring or collar of single supporting surfaces surrounding the nozzle opening annularly. These single supporting surfaces are orientated each, according to the invention, either parallel or essentially parallel to the sealing surface defined by the nozzle edge. Alternatively, it is possible that the single supporting surfaces are (slightly) beveled, in the overall view altogether cone-like (on the inside of the nozzle opening higher, declining towards the outside). The result is then that the single normal lines of the different supporting surfaces are not parallel to one another, but each are orientated in the space in another way, and, in a preferred modification of the invention, include with the normal line of the plane of the sealing surface defined by the nozzle edge an angle of 0° to 10°. According to the invention it is also possible that the supporting surface itself is not plane but arched, and, for example, is a part or segment of a cone or a truncated cone. The embodiment described before is also the subject matter of the claim number one as well as of the modifications and embodiments described before, and thus also serves for solving the problem set out in the beginning.

In a preferred embodiment of the invention one compensation channel each is provided between the single supporting surfaces. In this modification according to the invention the single supporting surfaces are arranged around the nozzle opening. From the nozzle edge to the outside there is the following sequence of components:

First of all, a distance area is linked to the nozzle edge. The distance area is designed like an annular groove and effects that in this area the nipple is not in contact, but is free even in the closing position (the nipple is in sealing contact with the nozzle edge), that means uncovered. In this area also the surrounding pressure of the valve space can act.

The supporting surface(s) is/are linked to the outside, this/these surround(s), for example, annularly or collar-like the nozzle. For a reliable ventilation just in the channel- or groove-like distance area it is then convenient to separate the single supporting surfaces by compensation channels running, for example, radial with reference to the center axis of the nozzle boring, in order to secure also in the closed condition of the nozzle a ventilation. The embodiment described before can be realized, of course, also in connection with all described embodiments or with single ones.

In select embodiments of the invention, the surface or the complete surface of the supporting surface (i.e., the aggregate surface area of the number of supporting surfaces) can be designed considerably larger than the surface of the nozzle edge on which the nipple is supported sealing on the nozzle. Thus, for example, it has been found in a modification according to the invention that the surface or complete surface of the supporting surface(s) is at least double the surface of the nozzle edge. Preferably here a limit of at least three times, in particular at least five times has also been found.

It is an essential advantage of the invention that the supporting surface can act like a stopper for the nipple, and thus the surface or the complete surface of the supporting surface(s) can be designed essentially independently from the nozzle surface, and can be perfected accordingly. Thus it has been found, for example, to be very convenient if the surface or the complete surface of the supporting surface(s) is at least half of the nozzle surface. The nozzle surface is here the surface on the nozzle edge sealed by the nipple against the surrounding pressure. The effect according to the invention occurs here already with 50% of the nozzle surface, however, it can be accordingly larger, for example the ratio between the surface or complete surface of the supporting surface(s) to the nozzle surface can also be more than 100%, 150%, 250% or 500%. The embodiment (modification) described before develops the subject matter of claim number one as well as of the preceding sub-claims or modifications and embodiments, and serves accordingly also for solving the problem set out in the beginning in the same way.

The invention does not only refer to the nozzle as described in the beginning, but also extends in the same way to a valve, in particular a solenoid valve equipped with a nozzle as described. The structure of the valve is here such that there is a valve space where, on the one hand, the nozzle, and, on the other hand, the nipple is arranged. The function is carried out by a relative motion of nipple and nozzle towards each other, wherein usually the nozzle or the nozzle opening is stationary, and the nipple is angled towards the nozzle. However, basically it is, according to the invention, also possible to reverse this kinematic concept in such a way, that the nipple is stationary and the nozzle moves.

Usually the nipple is connected with an operating device. This apparatus, that is, if necessary, separated from or flown through by the medium (for example liquid or gas) to be controlled, for example a solenoid the electromagnetic powers of which act on a movable supported armature when electric current flows through the magnet coil. As a consequence of that the armature and the armature rod connected with the armature on which the nipple is arranged or is operated by it moves. A considerably improved design of the nozzle according to the invention achieves with a valve equipped with a nozzle of this type a considerably higher service life, and thus a considerably higher efficiency. The suggestion according to the invention refers thus in the same way also to a valve, in particular a solenoid valve.

BRIEF DESCRIPTION OF THE DIFFERENT VIEWS OF THE DRAWINGS

Figure 2C:
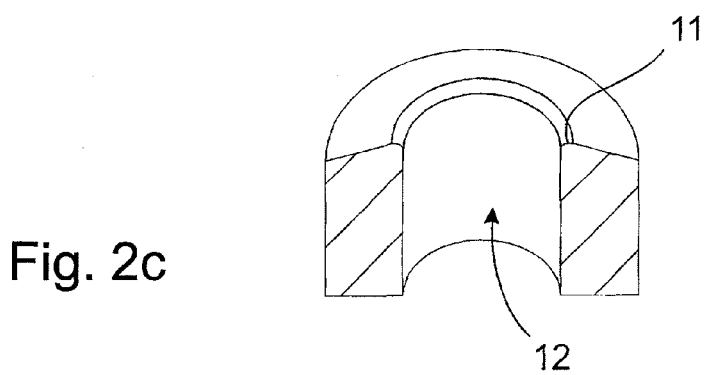

In the drawing the invention is shown schematically in particular in an example. In the figures:

FIGS. 1a, 1b in a side view the interaction of the nipple with the nozzle according to the invention in two different positions, FIG. 1c in a three-dimensional view (sectional) the nozzle according to the invention, FIG. 1d a detail according to FIG. 1b, FIGS. 2a, 2b in a side view the interaction of the nipple with a nozzle according to the state of the art in two different positions, FIG. 2c a tree-dimensional view (section-nal) of a nozzle according to the state of the art.

Figure 3:
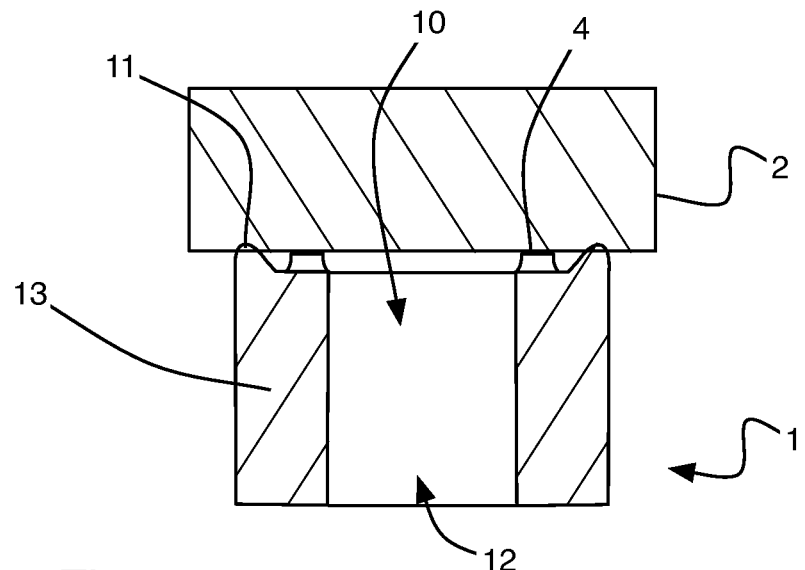

FIG. 3 in a side sectional view a second embodiment of a nozzle according to the invention.

Figure 4:
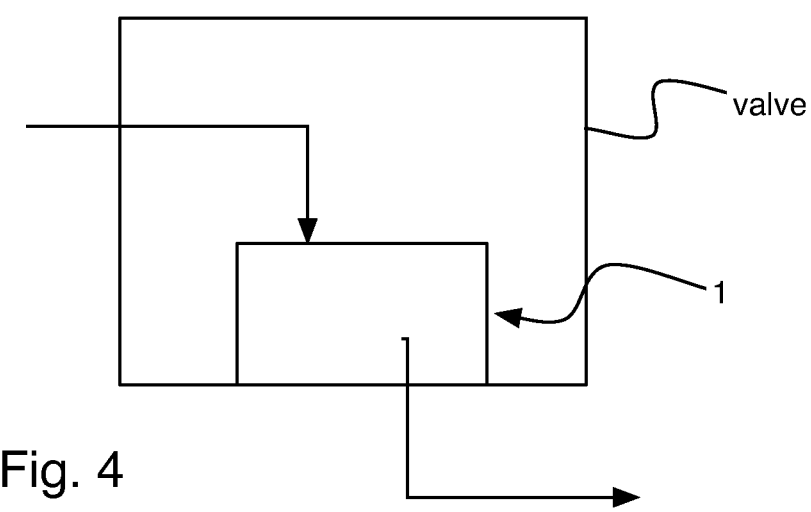

FIG. 4 in a schematic view a valve incorporating a nozzle according to an embodiment of the invention.

Figure 5:
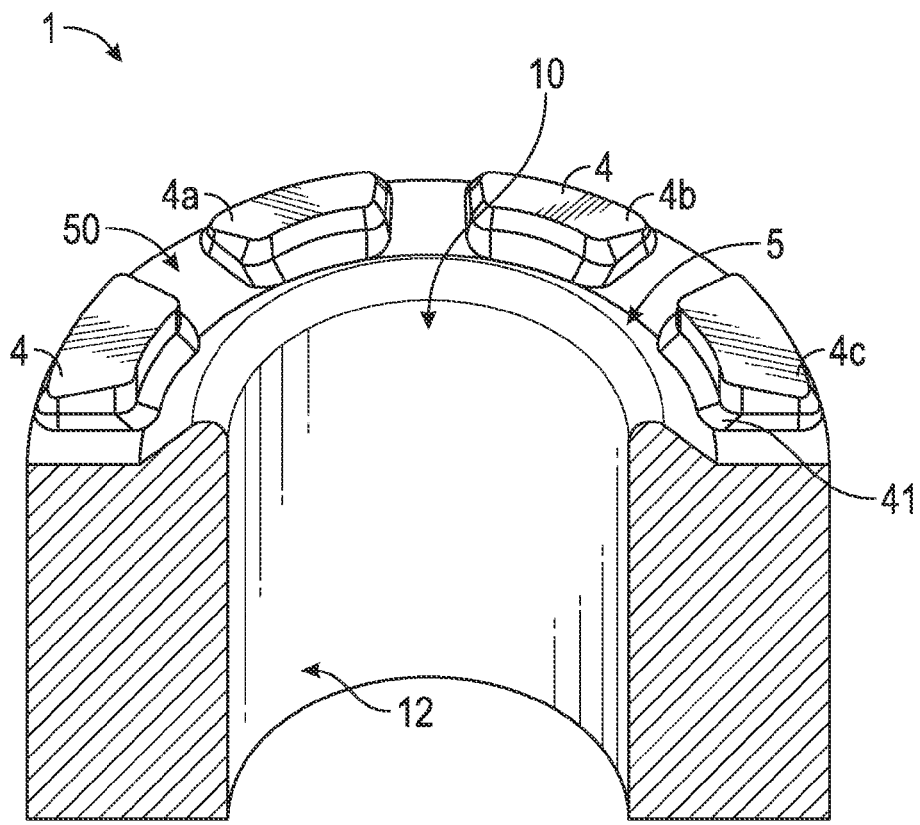

FIG. 5 in a side sectional view a third embodiment of a nozzle according to the invention.

DETAILED DESCRIPTION OF EMBODIMENTS

In the figures identical or corresponding elements are each indicated by the same reference numbers and are therefore, if not useful, not described anew.

FIGS. 2a, 2b and 2c show the solution according to the state of the art. The nozzle 1 consists of a nozzle body 13 that is usually rotational symmetric or cylinder-like, and has a nozzle boring 12. At the top end the nozzle boring 12 is terminated by the nozzle opening 10; this nozzle opening 10 is sealed or released by the nipple 2 according to the relative position of nipple 2 to the nozzle 1. For that usually the nipple 2 is pressed with appropriate holding power against the top edge 14. At the top edge 14 then the nozzle edge 11 is provided. In FIGS. 2a, 2b, 2c the conical design of the nozzle 1 can be seen clearly, the nipple 2 is only supported on the nozzle edge 11 facing the nozzle boring 12.

FIG. 2a shows a rather new nipple 2 as it is supported on the top edge 14 of nozzle 1. Nipple 2 seals nozzle 1 on the nozzle edge 11, the nozzle surface is indicated by $D_3$.

When the nipple 2 ages because of a number of switching operations of the valve, the situation is like in FIG. 2b. The nipple 2 is farther slid on the cone 15, the additional travel is indicated by $s_1$ in FIG. 2b. The result because of the cone 15 is here a considerable enlargement of the nozzle surface $D_4$, that is coupled with a correspondingly larger necessary holding power as the nozzle is arranged in the valve space in such a way that the pressure p surrounds the outside of the nozzle body 13 and also the nipple 2, and thus also presses the nipple to the nozzle edge 11.

According to the solution of the state of the art farther exterior areas of the cone 15 are also used for supporting the nipple 2 on the nozzle 1; this is coupled with a considerable enlargement of the travel $s_1$, on the one hand, and, on the other hand, with an appropriate enlargement of the nozzle surface and the resulting larger holding powers or retracting powers of the nipple 2 from the opening 10 of the nozzle 1.

The structure of nozzle 1 according to the invention can be seen in FIGS. 1a, 1b, 1c and 1d. The nozzle body 13 has a nozzle opening 12 that runs, facing the nipple 2, in a nozzle opening 10. On the end a nozzle edge 11 is provided. The limiting edge of the nipple 2 on the nozzle edge 11 encloses the nozzle surface D. FIG. 1a shows a rather unused new nipple 2 in use; the bead surrounding the nozzle opening 10 penetrates only imperceptibly the elastic nipple material. The feed motion of the nipple 2 in the direction of the nozzle 1 is indicated by arrow 20. Laterally to the outside (with respect to the nozzle opening 10) a number of supporting surfaces 4 is linked to the nozzle edge 11 on the outside. These supporting surfaces 4 recede about the distance $s_2$ towards the nozzle edge 11. The function of this supporting surface 4 can be seen in particular in FIG. 1b where the already aged nipple 2 is shown during use. The ring bead 16 carrying the nozzle edge 11 immerses also here slightly in the material of the nipple 2. However, the gap $s_2$, still shown in FIG. 1a, is closed in FIG. 1b, that means other areas of the nipple 2 are now supported on the supporting surfaces 4 surrounding the ring bead 16, and form a stopper there. Thus they limit the maximal travel of the nipple 2 in the direction of the nozzle 1. The nozzle in the modification according to the invention (see FIG. 1b) may also be designed cone-like, however, the enlargement of the nozzle surface $D_2$ is much lower as in the example according to FIG. 2b, and because of the stopper function of the supporting surfaces 4 also limited to it. The result is that the nozzle surface becomes only marginally larger when FIGS. 1a and 1b are compared, and therefore the holding forces hardly get larger when the application pressure is constant.

The arrangements of the single supporting surfaces 4, 4a, 4b and 4c around the nozzle opening 10 can be seen in particular in FIG. 1c. Between the ring bead 16, that can immerse in nipple 2, and the single annularly or collar-shaped arranged supporting surfaces 4 a distance area 5 is provided. Also the aged nipple 2 (see FIG. 1d) is not in contact with the cone in the distance area 5! This means the rather large surface of the supporting surfaces 4, 4a, 4b, 4c does not have a sealing function, but forms here only a stopper for the nipple 2. Therefore, it is basically possible to design this supporting surface 4 (one or more) rather large, so that from this the surface pressure on the nipple material 2 is correspondingly reduced which is also positive for the high service life of the nipple 2 and the complete arrangement (the nozzle or the valve equipped with the nozzle).

Cleverly, here between the single distance areas 4, 4a, 4b, 4c one compensation channel 50 each is provided connected with the ring groove-like or channel-like distance area 5, and thus at any time effects a pressure compensation, that is ventilation.

In FIG. 1d the detail of the support of the nipple 2 on the supporting surface 4 is outlined in enlarged view. The supporting surface 4 is here the top surface of the elevation 40 arranged on the side edge of the nozzle 1. In order to avoid sharp edges of the elevation 40 or the supporting surfaces 4, some lateral bevelings 41 are provided. The groove-like distance area 5 can be discerned clearly between the conically declining inner area of the nozzle 1 and the elevation 40 with the supporting surface 4.

According to the invention the effect is already achieved through a supporting surface 4. As shown in the embodiment, however, it is also convenient when a number of single supporting surfaces is provided surrounding the nozzle opening 10. For ventilating of the distance area 5 a number of compensation channels 50 is provided in the embodiment shown here. However, it is also possible to provide borings, extending radial with respect to the center axis of the nozzle boring 12, in the elevation forming the supporting surface 4, and thus to provide the compensation channel for ventilating the distance area 5. The supporting surface 4 is then continuously annular.

FIG. 3 shows in a side sectional view a second embodiment of a nozzle according to the invention, in which the supporting surface 4 is disposed radially within the sealing surface defined at the nozzle edge 11. Meanwhile, FIG. 4 shows in a schematic view a solenoid valves that incorporates a nozzle according to an embodiment of the invention.

FIG. 5 shows in a side sectional and perspective view a third embodiment of a nozzle 1 according to the invention, wherein the single supporting surfaces 4a, 4b, 4c, etc. are (slightly) beveled, in the overall view altogether cone-like (on the inside near the nozzle opening 10 higher, declining towards the outside or away from the nozzle opening). The result is then that the single normal lines of the different supporting surfaces are not parallel to one another, but each are orientated in the space in another way, and, in a preferred modification of the invention, include with the normal line of the plane of the sealing surface defined by the nozzle edge 11 an angle of 0° to 10°. Thus the overall supporting surface 4 itself is not plane but arched, and, for example, is a part or segment of a cone.

The nozzle according to the invention can be manufactured of very different materials, depending on the field of application. This may be, for example, a synthetic material that can be also processed, for example, into an injection moulded part. However, it is also possible to manufacture the nozzle 1 of metal wherein, if necessary, also metal-cutting machining steps are provided besides shaping (forming or sinking).

Although the invention has been described by exact examples which are illustrated in the most extensive detail, it is pointed out that this serves only for illustration, and that the invention is not necessarily limited to it, because alternative embodiments and methods become clear for experts in view of the disclosure. Accordingly, changes can be considered which can be made without departing from the contents of the described invention.

The invention claimed is:

1. A nozzle usable in a valve, comprising:
   at a top end thereof, a nozzle edge limiting a nozzle opening with a sealing surface that can be sealed or released by a nipple; and
   at least one supporting surface provided for the nipple on the nozzle, spaced apart from the nozzle edge by a distance area, such that the nipple, when supported on the supporting surface and the nozzle edge, bridges the distance area freely,
   wherein the at least one supporting surface itself is not plane but arched as a part or a segment of a cone or of a truncated cone, and has areas tilted with reference to the sealing surface, whereby the tilted areas of the at least one supporting surface interact with accordingly tilted areas of the nipple to support the nipple aged by an amount of valve switching processes.

2. A nozzle according to claim 1, wherein the at least one supporting surface is receded from the nozzle edge in the direction toward the bottom end of the nozzle.

3. A nozzle according to claim 1, wherein the at least one supporting surface surrounds the nozzle opening.

4. A nozzle according to claim 1, wherein a number of the at least one supporting surfaces surround the nozzle opening annularly.

5. A nozzle according to claim 1, wherein the nozzle edge surrounds the at least one supporting surface.

6. A nozzle according to claim 1, wherein a number of the at least one supporting surfaces are arranged annularly, cone-like around the nozzle opening.

7. A nozzle according to claim 1, wherein a number of the at least one supporting surfaces surround the nozzle opening annularly, and the normal line of each single supporting surface includes, with the normal line of the sealing surface defined by the nozzle edge, an angle of 0° to 10°.

8. A nozzle according to claim 1, wherein a number of the at least one supporting surfaces surround the nozzle opening annularly, and one compensation channel each is provided between the single supporting surfaces.

9. A nozzle according to claim 1, wherein the area of the at least one supporting surface is at least double the area of the sealing surface.

10. A nozzle according to claim 1, wherein a number of the at least one supporting surfaces surround the nozzle opening annularly, and the aggregate surface area of the at least one supporting surfaces is at least half of the area of the nozzle surfaces limited by the nozzle edge.

11. A solenoid valve including a nozzle according to claim 1.

* * * * *

UNITED STATES PATENT AND TRADEMARK OFFICE
CERTIFICATE OF CORRECTION

| | | |
|---|---|---|
| PATENT NO. | : 8,763,935 B2 | Page 1 of 1 |
| APPLICATION NO. | : 13/017616 | |
| DATED | : July 1, 2014 | |
| INVENTOR(S) | : Johann Weiβ et al. | |

It is certified that error appears in the above-identified patent and that said Letters Patent is hereby corrected as shown below:

On The Title Page,

Please correct item (73) Assignee:

from:   SVM Schultz Verwaltungs-GmbH Co. KG to:   SVM Schultz Verwaltungs-GmbH & Co. KG Signed and Sealed this
Twenty-third Day of June, 2015

Michelle K. Lee
*Director of the United States Patent and Trademark Office*